United States Patent [19]

Lew et al.

[11] Patent Number: 4,544,300

[45] Date of Patent: Oct. 1, 1985

[54] SLIDE CONNECTORS WITH LOCKING MEANS

[76] Inventors: Hyok S. Lew; Yon S. Lew, both of 7890 Oak St., Arvada, Colo. 80005

[21] Appl. No.: 465,108

[22] Filed: Apr. 7, 1983

[51] Int. Cl.[4] ............................................. F16B 5/00
[52] U.S. Cl. .................................... 403/170; 403/331; 403/381
[58] Field of Search ............... 403/331, 381, 170, 175, 403/382, 231; 52/280, 282

[56] References Cited

U.S. PATENT DOCUMENTS

| | | | |
|---|---|---|---|
| 3,186,561 | 6/1965 | Strassle | 52/282 X |
| 3,547,472 | 12/1970 | Ehrman | 403/381 |
| 4,125,338 | 11/1978 | Lew | 403/381 X |
| 4,342,524 | 8/1982 | Anderson | 403/374 X |

FOREIGN PATENT DOCUMENTS

| | | | |
|---|---|---|---|
| 2008561 | 9/1970 | Fed. Rep. of Germany | 52/280 |
| 167465 | 10/1922 | United Kingdom | 403/381 |

*Primary Examiner*—Andrew V. Kundrat

[57] ABSTRACT

This invention relates to the slide connectors with locking means which are used to removably connect two boards in L-connection and/or three boards in T-connection and/or four boards in a cross connection. The slide connectors with locking means comprises an elongated member with four side surfaces having a retaining slide groove disposed in each of said four sides and a retaining slide rail matching to said retaining slide groove disposed on each end of the board to be connected into L or T or cross connections. One or both ends of said elongated member includes a threaded or a plain hole with a finite depth disposed at the center of the cross section of said elongated member, the cross section of which hole slightly extends into the root of said four retaining slide grooves; whereby, the crest of said retaining slide rail extends slightly into said hole. A set screw or a pin having an indented side surface driven into said hole grabs the root of said retaining slide rail and consequently, establishes a non-slidable connection.

6 Claims, 10 Drawing Figures

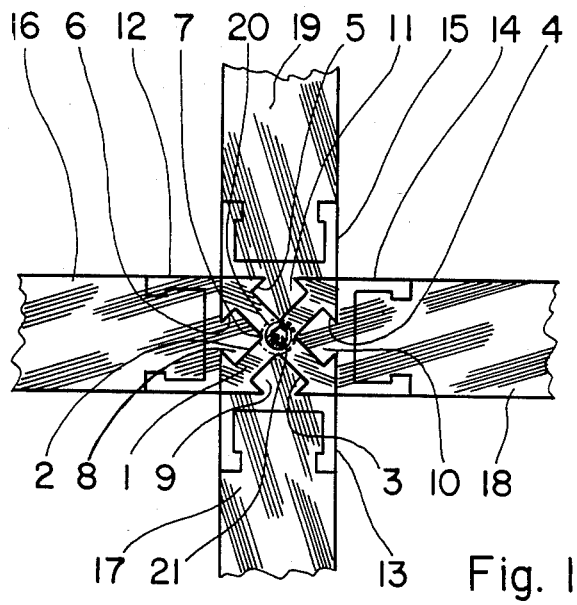
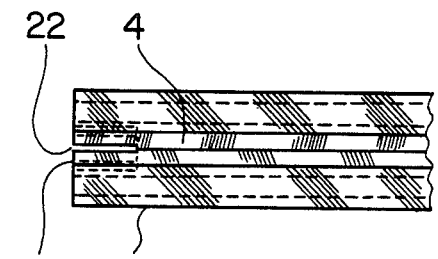
Fig. 1
Fig. 2
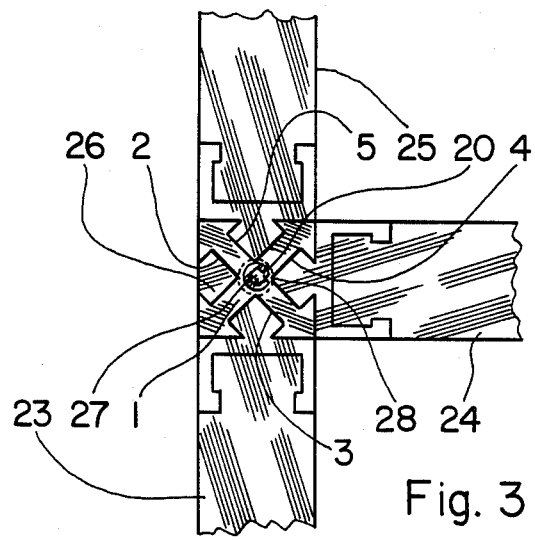
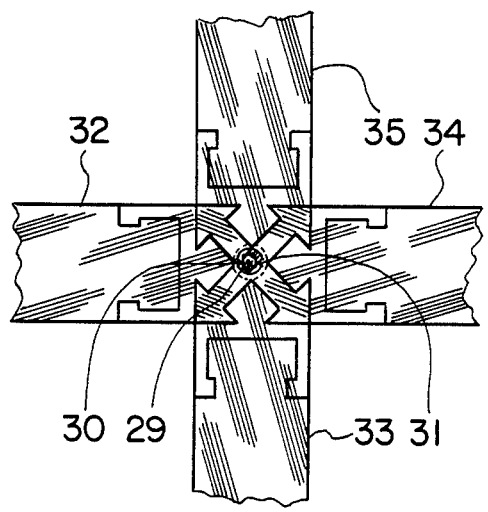
Fig. 3
Fig. 4
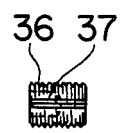
Fig. 5

SLIDE CONNECTORS WITH LOCKING MEANS

The storage shelves such as the book shelves are used in many homes. The existing methods of constructing the storage shelves are unsatisfactory to many users, especially those who live in the apartments or rented houses and have to move frequently, for the reason that the existing permanently assembled block shelves are not only bulky but also lacks a structural rigidity and, consequently, they are nuisance in moving. Furthermore, sometimes it is difficult to find right spaces for the preassembled book shelves in many apartment buildings. There are modular type and/or knock-down type book shelves. However, such book shelves constructed per existing technology lack elegance and versatility in appearance and construction.

The primary object of the present invention is to provide the slide connectors with locking means that enables to construct a custom designed storage shelves by using a set of standard components.

Another object of the present invention is to provide the slide connectors with locking means for constructing the storage shelves which can be easily assembled and disassembled by the users.

A further object of the present invention is to provide the knock-down type storage shelves that includes the sliding drawers or sliding shelves.

Still another object of the present invention is to provide the knock-down type storage shelves having an elegant appearance.

Still a further object of the present invention is to provide the knock-down type storage shelves having a sturdy and rigid structure.

Yet another object of the present invention is to provide the known-down type storage shelves which are inexpensive.

Yet a further object of the present invention is to show the industry that an advanced concept in the geometry and structures can be successfully applied to an mundane art such as the construction of the storage shelves.

These and the other objects of the present invention will become clear as the description of the present invention proceeds. The present invention may be described with a great clarity and specificity by referring to the following figures:

FIG. 1 illustrates an end view of the slide connectors with locking means used for a cross connection of four boards, which connectors are constructed in accordance with the principles of the present invention.

FIG. 2 illustrates a side view of the elongated member employed in the slide connectors with locking means.

FIG. 3 illustrates an end view of the slide connectors with locking means used for a T-connection of three boards wherein the horizontal board is slidable.

FIG. 4 illustrates another cross connection of four boards wherein two horizontal boards are slidably connected to two non-slidable vertical boards by using the slide connectors with locking means.

FIG. 5 illustrates a side view of a locking pin with one or two grooves employed in the slidable connection of boards as shown in FIG. 3 or 4.

Figure 6:
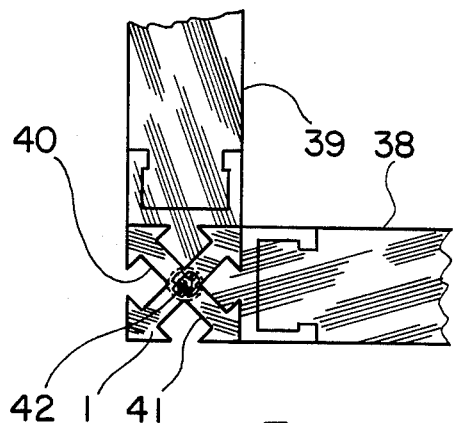
FIG. 6 illustrates an L-connection of two boards made of slide connector with locking means wherein the locking pin with multiple grooves are in the open position.

In FIG. 1 there is shown an end view of a slide connector assembly including the four-sided elongated member having four retaining slide grooves 2,3,4 and 5 disposed on four sides of the elongated member 1, respectively. The cross section of each of these retaining slide grooves is characterized by the narrowed-down opening 6 and the substantially V-shaped bottom 7 axisymmetrically located about the geometric center of the cross section of the elongated member 1. Each of the retaining slide grooves 2,3,4 and 5 is engaged by the matching retaining slide rails 8, 9, 10 and 11, with cross section including a narrowed-down root and a ridge respectively, each of which slide rails are integrally constructed into the end members 12,13,14 and 15 rigidly connected to the ends of the boards 16,17,18 and 19, which board are connected to one another in the cross connection by means of the elongated member 1. The elongated member 1 includes a plain or tapped hole 20 of a finite depth located at the geometric center of the cross section of the elongated member 1 at one or both ends. The perimeter of the hole 20 overlaps slightly into the substantially V-shaped bottoms of the retaining slide grooves whereby the set screw or pin with serrated cylindrical surface 21 screwed or driven into the hole 20 interferes with the ridges of the retaining slide rails 8,9,10 and 11, which engagements prevents those retaining slide rails affixed to the ends of the boards from sliding relative to the elongated member 1. Of course, it is obvious that a screw with a head may be used in place of the set screw or pin 21. The set screw or pin 21 should have a means to drive it into and out of the hole 20, which may be a hex-socket or tapped hole disposed on one end of said set screw or pin 21. Hereafter, the terminology "locking member engaging the locking hole" will be used to imply the set screw or pin or other screw with head driven into the hole 20.

In FIG. 2 there is shown a side view of one extremity of the elongated member 1 with the retaining slide grooves 2,3,4 and 5 and the locking hole 20 centrally located on one end of the elongated member 1. It should be noticed that there is the slitted openings 22 along the substantially V-shaped bottoms of the retaining slide grooves as the perimeter of the locking hole 20 slightly overlaps into the substantially V-shaped bottoms of the retaining slide grooves.

In FIG. 3, there is shown an end view of the elongated member 1 with the retaining slide grooves 2,3,4 and 5 employed to provide a T-connection of three boards 23,24 and 25 each of which is provide with the retaining slide rails at its extremity, which slide rails with the cross section matched to the cross section of the retaining slide grooves engage the retaining slide grooves in a sliding relationship. The retaining slide groove 2 which is not utilized to connect any shelf is engaged by the filler member 26 having a cross section flushly matching the cross section of the retaining slide grooves. The locking hole 20 is engaged by a locking screw or locking member 27 having a longitudinal groove 28, which locking member 27 locks the boards 23 and 25 to the elongated member 1 while it allows the board 24 to slide relative to the elongated member 1. Such an arrangement is useful for constructing a book shelf with the sliding drawers or the pull-out boards.

In FIG. 4 there is shown a cross connection of four boards assembled in the same cross connection as illustrated in FIG. 1. Here a locking member 29 with two longitudinal grooves 30 and 31 disposed at two diametrically opposite positions, is driven into the locking hole to lock two vertical boards 33 and 35 to the elongated member 1 wherein two horizontal boards 32 and 34 are slidably connected to the elongated member 1.

In FIG. 5 there is shown a side view of a locking member 36 with the longitudinal groove 37, which represents the locking member of a preferable design that may be used in place of the locking members 27 and 29 respectively employed in the assembly shown in FIG. 3 or 4.

In FIG. 6 there is shown an end view of a L-connection connecting two boards 38 and 39 in ninety degree angle. Here the unused retaining slide grooves 40 and 41 of the elongated member 1 are not filled with any filler member. The locking member 42 does not always need to be a threaded or serrated member for the following reason. The locking member 42 may be a plain cylindrical member with four equally spaced longitudinal grooves having an outside diameter slightly less than the inside diameter of the locking hole, which slides into the locking hole freely when the longitudinal grooves of the locking pin is lined up with the substantially V-shaped bottoms of the retaining slide groove of the elongated member 1 as shown in FIG. 6.

Figure 7:
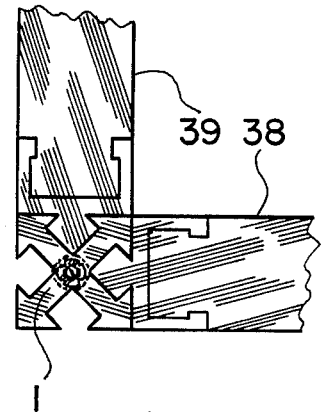
FIG. 7 illustrates the L-groove same as that of FIG. 6, but with the locking pin in the lock position.

When the locking pin 42 is rotated to a position as shown in FIG. 7 wherein the locking pin is rotated to a position where the longitudinal grooves are located intermediate the substantially V-shaped bottoms of the retaining slide grooves of the elongated member 1, the natural cylindrical surface interferes with the rigid rails affixed to the ends of the boards 38 and 39, and, consequently, locks the boards to the elongated member 1.

Figure 8:
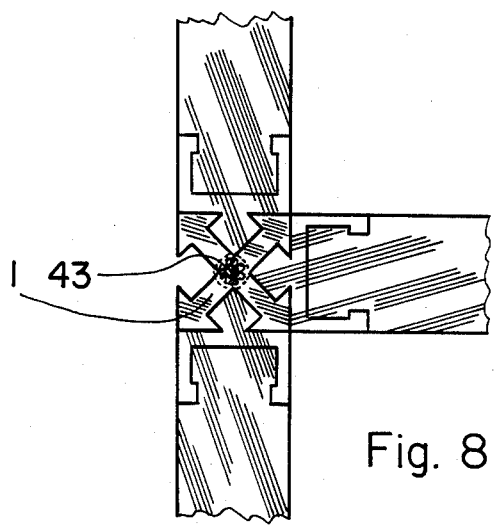
FIG. 8 illustrates another T-connection of three shelves wherein the horizontal board is slidably connected to two nonsliding vertical grooves by using a locking pin with a multiple grooves.

In FIG. 8 there is shown an end view of a T-connection employing the elongated member 1 wherein a locking pin 43 with multiple longitudinal grooves engaging the locking hole in the same manner as illustrated in FIG. 7 locks two vertical boards while the horizontal boards is left slidable, which slidable horizontal board can be part of the sliding drawer or a pull-out board.

Figure 9:
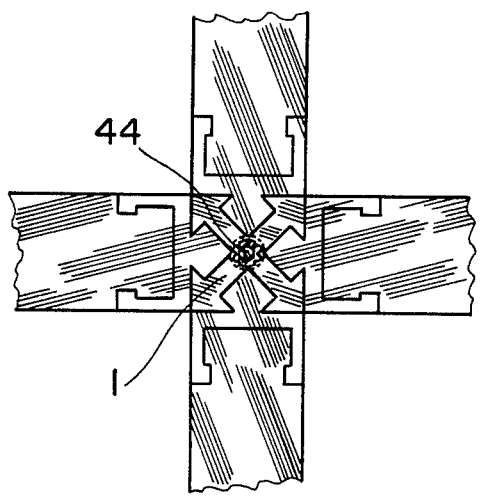
FIG. 9 illustrates a further cross connection of four boards wherein two horizontal boards are slidably connected to two nonsliding boards by using a locking pin with multiple grooves.

In FIG. 9 there is shown an end view of a cross connection employing the elongated member 1 in conjunction with the locking pin 44 with multiple longitudinal grooves, which combination connects two vertical boards nonslidably and two horizontal boards slidably to the elongated member 1.

Figure 10:
FIG. 10 illustrates a side view of a locking pin with multiple grooves.

In FIG. 10 there is shown a side view of the locking pin with multiple longitudinal grooves having a serrated cylindrical surface that may be used in connecting the boards as illustrated in FIGS. 7, 8 or 9. Of course the locking pin 42 may have smooth cylindrical surface instead of the serrated one.

By combining or electing the combinations shown in FIGS. 1 through 10, one can build a very elegant, sturdy and economic shelve systems in a systematic manner. One can design a shelve system custom fit to the space available in one's dwelling and, then build it by using the common parts after securing a combination of the boards of predetermined length.

While the principles of the present invention have now been made clear by the illustrative embodiments as shown in FIGS. 1 through 10, the general teachings of the present invention shall not be limited to such specific embodiments. It will be immediately obvious to the skilled in the art many modifications of the structure, elements, proportions, materials and arrangement which are particularly adapted to the specific working conditions and operating environment in practicing the present invention without departing from the principles of the present invention.

We claim:

1. A slide connector with locking means for connecting a plurality of boards in L, T or cross connection, said slide connector comprising in combination:

(a) a four-sided elongated member including four retaining slide grooves disposed respectively on said four sides of said elongated member longitudinally, the cross section of each of said retaining slide grooves including a narrowed-down opening disposed on each of said four sides of said elongated member and a bottom of substantially V-shaped cross section disposed adjacent to the geometric center of the cross section of said elongated member, (b) at least one locking hole of a finite depth disposed at least at one end of said elongated member, said locking hole having a perimeter slightly over-lapping into said bottom of substantially V-shaped cross section of said retaining slide grooves;

(c) a plurality of retaining slide rails rigidly affixed to ends of a plurality of boards, respectively, each of said retaining slide rails having a cross section matched to the cross section of said retaining slide groove including a narrowed-down root and a ridge, said retaining slide rails slidably engaging said retaining slide grooves included in said elongated member; and (d) at least one generally cylindrical locking member engaging said locking hole wherein the cylindrical surface of said generally cylindrical locking member interferes with said ridges of said retaining slide rails engaging said retaining slide grooves;

whereby, said slide connector with locking means connects said plurality of boards in L, T or cross connection in a substantially rigid relationship.

2. The combination as set forth in claim 1 wherein said cylindrical locking member includes one or more longitudinal grooves disposed on the cylindrical surface of said cylindrical locking member wherein said retaining slide rail is slidable relative to said elongated member when said longitudinal groove is aligned with said ridge of said retaining slide rail.

3. The combination as set forth in claim 1 wherein an elongated filler member having a cross section matched to the cross section of said retaining slide groove slidably engages said retaining slide groove not engaged by said retaining slide rail and locked in place by said cylindrical locking member.

4. A slide connector with locking means for connecting a plurality of boards in L, T or cross connection, said slide connector comprising in combination:

(a) a four-sided elongated member including four retaining slide grooves disposed respectively on said four sides of said elongated member longitudinally, the cross section of each of said retaining slide grooves including a narrowed-down opening disposed on each of said four sides of said elongated member and a bottom of substantially V-shaped cross section disposed adjacent to the geometric center of the cross section of said elongated member;

(b) at least one threaded locking hole of a finite depth disposed at least at one end of said elongated member, said threaded locking hole having a perimeter slightly overlapping into said bottoms of substantially V-shaped cross section of said retaining slide grooves;

(c) a plurality of retaining slide rails rigidly affixed to ends of a plurality of boards, respectively, each of said retaining slide rails having a cross section matched to the cross section of said retaining slide groove including a narrowed-down root and a ridge, said retaining slide rails slidably engaging said retaining slide grooves included in said elongated member; and (d) at least one threaded cylindrical locking member threadedly engaging said threaded locking hole wherein the threaded cylindrical surface of said threaded cylindrical locking member interferes with said ridges of said retaining slide rails engaging said retaining slide grooves;

whereby said slide connector with locking means connects said plurality of boards in L, T or cross connection in a substantially rigid relationship.

5. The combination as set forth in claim 4 wherein said threaded cylindrical locking member includes one or more longitudinal grooves disposed on the threaded cylindrical surface of said threaded cylindrical locking member wherein said retaining slide rail is slidable relative to said elongated member when said longitudinal groove is aligned with said ridge of said retaining slide rails.

6. The combination as set forth in claim 4 wherein an elongated filler member having a cross section matched to the cross section of said retaining slide groove slidably engages said retaining slide groove not engaged by said retaining slide rail and locked in place by said threaded cylindrical locking member.

* * * * *